Patented Oct. 29, 1940

2,219,364

UNITED STATES PATENT OFFICE

2,219,364

PARASITICIDE

James Gordon Horsfall and Ross Frisbie Suit, Geneva, N. Y.; said Horsfall assignor to Cornell Research Foundation, Ithaca, N. Y., and said Suit assignor to Röhm & Haas Company, Philadelphia, Pa.

No Drawing. Application May 6, 1938,
Serial No. 206,377

6 Claims. (Cl. 167—16)

This invention relates to parasiticidal sprays which contain, as their active principle, cuprous oxide. It relates more particularly to the preparation of an aqueous suspension of cuprous oxide which is much more stable and also more effective than similar aqueous suspensions heretofore available. It also relates to a dry powder containing cuprous oxide which may be used in dusting various plants for combating parasites.

A great many materials have been prepared in the past for combating parasites of all kinds which infest plants, soils, flowers, vegetables, etc. and in many of these the active principle has been cuprous oxide. Such preparations have appeared as solid mixtures, pastes and liquids, several of the last type being in the form of aqueous suspensions. For reasons of economy and in order to avoid possible injury to delicate foliage and other plant parts, water is preferable to most organic liquids as the suspending medium for cuprous oxide, but up to the present no satisfactory method has been found for preparing dispersions of cuprous oxide in which the tendency to settle is retarded or practically eliminated when the concentration of the cuprous oxide is about that normally used in such preparation, viz: a few ounces per hundred gallons of water. Stable pastes have been prepared but in practically all cases, when these were diluted to spraying consistency and concentration, the cuprous oxide tended to settle out.

It is an object of this invention to provide a spray in the form of an aqueous suspension of cuprous oxide in which the difficulties inherent in prior sprays are eliminated and which exhibit a greater parasiticidal action at the same cuprous oxide concentration than is exhibited by other known sprays.

This object is accomplished by combining with the cuprous oxide in dry form or in a paste a certain amount of sulfite-cellulose residue and of magnesium oxide. When pastes or dry materials thus prepared are added to amounts of water such that there is only a few ounces of cuprous oxide in one hundred gallons, the rate of settling is much slower than that of a similar suspension made without the sulfite-cellulose residue and the magnesium oxide. Moreover, neither the magnesium oxide nor the sulfite-cellulose residue alone will accomplish the same result.

The rates of settling of various mixtures containing a constant amount of cuprous oxide combined with varying amounts of sulfite residue and magnesium oxide were measured. These measurements were made as follows: Several samples of 0.5 g. each of cuprous oxide were weighed out and mixed dry with different amounts of sulfite-cellulose residue and light magnesium oxide. These mixtures were suspended in 200 cc. of water, the resulting suspension being equivalent to 16.6 oz. cuprous oxide per 50 gallons, and shaken for two minutes. The suspension was then poured into a 100 cc. graduate, filling it to the 100 cc. mark, and allowed to stand. The time necessary for the boundary separating clear liquid from the suspension to fall to the 90 cc. mark was noted. These times in minutes and the amounts of magnesium oxide and sulfite-cellulose residue are given in the following table:

| Oz./50 gal. MgO | Oz./50 gal.—sulfite-cellulose residue | | | | | |
|---|---|---|---|---|---|---|
| | None | 2 | 4 | 6 | 8 | 12 | 16 |
| None | 24 | 72 | | | 74 | | 59 |
| 2 | 28 | 75 | 81 | 88 | 97 | 128 | 118 |
| 4 | | 86 | 94 | 106 | 115 | 150 | 123 |
| 6 | | | | | 138 | | |
| 8 | 23 | | | | 124 | 131 | 131 |
| 10 | | | | | 124 | | |
| 12 | 15 | | | | 124 | 139 | 139 |

The cuprous oxide used in these tests was protected from oxidation by a thin coating of glue according to the method set forth in the copending application of Loren C. Hurd, Serial No. 190,036, filed February 11, 1938. The sulfite-cellulose residue employed was the dry powder obtained from sulfite-cellulose liquors and commonly known under the trade name "Goulac." The magnesium oxide was the so-called light calcined magnesia. It is obvious from the results tabulated above that the magnesium oxide alone has no effect on the rate of settling, whereas the sulfite-cellulose residue causes quite a considerable decrease in this rate. However, when both magnesium oxide and sulfite-cellulose residue are present, the rate of settling is still further reduced and to an extent which could not have been predicted because the magnesium oxide alone has no effect on the settling rate. Thus, by combining the cuprous oxide with magnesium oxide and sulfite-cellulose residue, either in the dry state or as a paste, and diluting to the concentration of cuprous oxide usually employed in parasiticidal sprays, a much more stable suspension is obtained.

When such suspensions are sprayed on plants for the purpose of protecting them against pests, they show two outstanding advantages over other sprays containing cuprous oxide. First, the cuprous oxide is more effective and can be used in smaller amounts, thus reducing the tendency to injure the foliage and, second, the residue left on evaporation of the water is more adherent and not so easily washed off by rain as are some other types of cuprous oxide spray. The increased activity of the cuprous oxide sprays containing magnesium oxide and sulfite-cellulose residues is probably due in part to a better and more stable dispersion and also to the fact that on evaporation of the water after spraying, the residue is not so easily washed off by rain.

The adhesive qualities of the new spray as compared to the older types are shown by the following tests:

Apple trees were sprayed five times at about two-week intervals between the middle of May and the middle of July with two sprays, one made according to the present invention and ore made up with the cuprous oxide containing glue made by the process of Hurd's application mentioned above. The spray made according to this invention contained one pound of cuprous oxide, 4 ounces of light magnesium oxide and 8 ounces of the dry sulfite-cellulose residue known as "Goulac" in 100 gallons of water. The other spray contained 2 pounds of the glue-coated cuprous oxide in 100 gallons. The former, therefore, contained only about one-half as much cuprous oxide per 100 gallons as the latter. The apple trees after the five sprayings mentioned were left until the middle of October when the fruit was harvested. At that time the leaves were analyzed for copper and it was found that the leaves sprayed with the new type of spray had 200 parts per million of copper residue, whereas those sprayed with the other type had only 128 parts in spite of the fact that the latter spray contained about twice as much copper. Thus, the new type is about four times as effective as the old one in keeping the cuprous oxide on the foliage.

The superiority in the effectiveness of the new type of spray may be illustrated by comparing it with another cuprous oxide spray in the control of black spot on roses.

Four sprays were made up as follows: From the new mixture containing 16 parts of cuprous oxide, 4 parts of magnesia and 8 parts of Goulac Spray No. 1—1.75 oz. of mixture per 50 gallons of water Spray No. 2—0.88 oz. of mixture per 50 gallons of water Spray No. 3—0.44 oz. of mixture per 50 gallons of water Spray No. 4—2.0 oz. of cuprous oxide glue per 50 gallons of water.

Sprays 1, 2 and 3 contained one-half, one-quarter and one-eighth as much cuprous oxide respectively as Spray No. 4. These were sprayed on roses eleven times from June 15th to September 15th and the percentage of plants showing black spot noted at intervals. The results were as follow:

|  | Percent plants diseased | | | Percent defoliation |
|---|---|---|---|---|
| Date of observation | 6/29 | 7/27 | 9/27 | |
| Spray No. 1 | 1.42 | 13.2 | 80.0 | 33.6 |
| Spray No. 2 | 2.0 | 11.2 | 91.2 | 43.5 |
| Spray No. 3 | 11.4 | 42.4 | 98.0 | 74.5 |
| Spray No. 4 | 12.0 | 43.0 | 100.0 | 75.8 |

It is apparent from these results that in the control of this disease the new sprays are considerably more effective. The new spray containing only one-eighth as much cuprous oxide gave results almost identical with those of the older type, whereas sprays of the new type containing only one-half and one-quarter as much cuprous oxide are vastly superior.

The cuprous oxide, magnesia and sulfite-cellulose residue can be mixed wet or dry. It is preferable to mix them dry in any suitable type of mixer and then to prepare the sprays when they are to be used by simply mixing the combined materials with the desired amount of water. The mixture containing the three ingredients disperses very easily in water and the spray can be prepared without any special mechanical equipment. The best proportions have been found to be 16 parts by weight of cuprous oxide, 8 parts of sulfite-cellulose residue and 4 parts of magnesia. These proportions may be varied over a considerable range, for example, from about 4 to about 12 parts of magnesia and from about 4 to about 16 parts of sulfite-cellulose for each 16 parts of cuprous oxide. It is advisable to keep the ratio of sulfite-cellulose residue to magnesia about 2 to 1. The amount of such mixtures used varies with the use to which they are put. For the hardier plants sprays containing 16 oz. of cuprous oxide per 100 gallons can be used, whereas for the delicate ones sprays containing as little as one ounce have been found effective. It is not advisable to use a spray containing much more than 12 oz. of sulfite-cellulose per 100 gallons as the tendency to foam is considerable at higher concentrations.

In the foregoing the effectiveness of the new combination of cuprous oxide, magnesium oxide and sulfite-cellulose residue, when made up into an aqueous dispersion and used as a means for combating pests on plants, etc., has been shown. The dry powder, however, may also be mixed with inert powders such as talc, clays, infusorial earth, etc. and used as a dust for the same purpose. A typical mixture suitable for such use may have the following composition:

Mixture of  Pts.

| Cuprous oxide | 4 pts. | |
|---|---|---|
| Magnesium oxide | 1 pt. | 10 |
| Sulfite-cellulose residue | 2 pts. | |
| Flour | | 10 |
| Talc | | 80 |

These materials are all mixed dry in any convenient type of mixer. The proportions of cuprous oxide, magnesium oxide and sulfite-cellulose residue can be varied as desired as can also the ratio of this mixture to the other ingredients.

The mixture of cuprous oxide, magnesium oxide and sulfite-cellulose residue can also be used in conjunction with other insecticides such as the arsenicals, rotenone, organic thiocyanates, derris, pyrethrum, etc. as dusts or suspended in water or in solutions of the organic insecticides.

The advantages of the parasiticide prepared according to the present invention have been illustrated by showing their effectiveness on apple trees and rose bushes. They are, however, applicable to all other types of plants for the control of various pests. The best concentrations of cuprous oxide for any given plants or conditions can only be determined by actual test so that the invention is not limited to the exact concentrations given above but is limited only by the scope of the following claims.

We claim:

1. A parasiticidal composition of matter comprising cuprous oxide, magnesium oxide and sulfite-cellulose residue.

2. A parasiticidal composition of matter containing cuprous oxide, magnesium oxide and sulfite-cellulose residue in the proportions by weight of about 4:1:2 respectively.

3. A parasiticidal composition of matter comprising cuprous oxide, magnesium oxide and sulfite-cellulose residue in which the proportion of magnesium oxide to sulfite-cellulose residue is about 1:2.

4. A dry parasiticidal powder comprising cuprous oxide, magnesium oxide, sulfite-cellulose residue and an inert powder.

5. A spray for controlling parasites on vegetation comprising a mixture of cuprous oxide, magnesium oxide, sulfite-cellulose residue and water.

6. A spray for controlling parasites on vegetation comprising a mixture of cuprous oxide, magnesium oxide, sulfite-cellulose residue and water containing from about 1 to about 16 ounces of cuprous oxide in 100 gallons of water.

JAMES G. HORSFALL.
ROSS F. SUIT.